No. 728,678. PATENTED MAY 19, 1903.
L. C. CUMMINGS.
RESILIENT TIRE.
APPLICATION FILED AUG. 18, 1902.
NO MODEL.
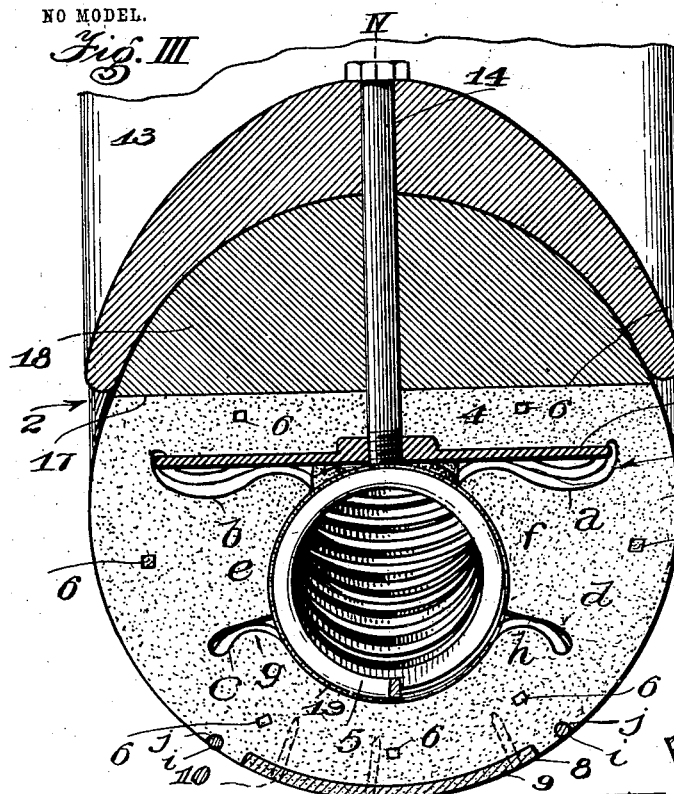
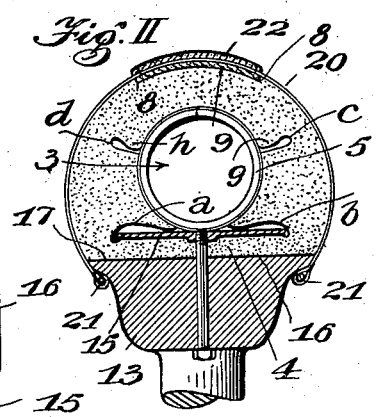
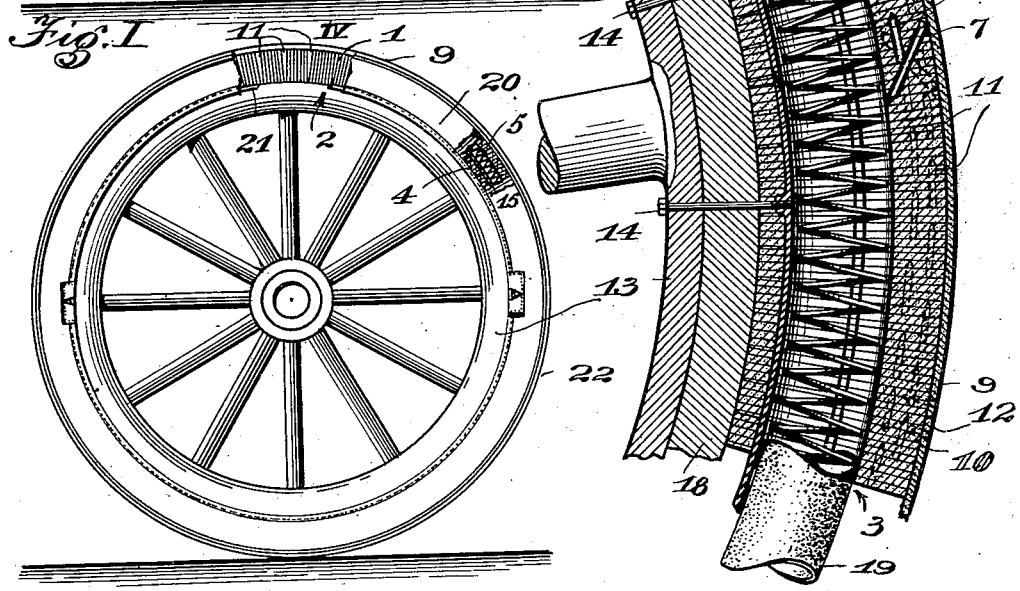
Witnesses
Inventor
Lincoln Clifford Cummings No. 728,678. Patented May 19, 1903.

UNITED STATES PATENT OFFICE.

LINCOLN CLIFFORD CUMMINGS, OF PASADENA, CALIFORNIA.

RESILIENT TIRE.

SPECIFICATION forming part of Letters Patent No. 728,678, dated May 19, 1903.

Application filed August 18, 1902. Serial No. 120,134. (No model.)

*To all whom it may concern:*

Be it known that I, LINCOLN CLIFFORD CUMMINGS, a citizen of the United States, residing at Pasadena, in the county of Los Angeles and State of California, have invented certain Improvements in Resilient Tires, of which the following is a specification.

This invention relates to a tire designed for use on the wheels of road-motors and other vehicles.

An object of the invention is to provide a superior substitute for resilient tires now in use combining cheapness, lightness, strength, durability, great resiliency, and proof against collapsing.

A further object is to provide a resilient tire which can be readily applied to and removed from the rim of a wheel and which will be strong and not susceptible to lateral displacement and will be durable and have a removable and renewable portion at the tread.

Another object is to provide a jointed resilient hollow tire which can be taken apart and put together for the purpose of repair and to provide a practically indestructible resilient tire and one which will not be subject to any injury from rim chafing or cutting or to puncturing.

My invention embraces a resilient tire which is D shape in cross-section and is desirably formed of plates respectively constructed on the cantaliver principle and furnished with internal limbs, which will be flexed in cross-section under heavy collapsing strains.

While I prefer to construct the perforated plates 1 and the tread of leather, it is obvious that any substitute having substantially the qualities and properties of leather for this purpose may be substituted therefor, and while I have used the term "leather" as applied thereto I mean thereby to include any such substitute.

The invention may be applied in various forms.

The accompanying drawings illustrate the invention in the best form in which I at present contemplate embodying the same.

Figure I is a view of a wheel furnished with a tire constructed in accordance with my invention and covered with a tire-protector, portions being broken away to expose the interior construction. Fig. II is a fragmentary cross-sectional view of the tire and felly of said wheel. Fig. III is a cross-section illustrating the invention as applied on a wheel the felly or rim of which has been constructed for the common type of pneumatic tire. Fig. IV is a section on line indicated by IV IV of Fig. III.

1 designates perforated plates, desirably of sole-leather, which may be treated in any suitable way for hardening and protecting the same against effects of moisture. Said plates are fastened together side by side flatwise to form a hollow ring 2. They may be variously constructed and variously fastened together. In the preferred form the perforation 3 has a plurality of laterals, as $a$, $b$, $c$, and $d$, so that the plates have internal limbs $e$, $f$, $g$, and $h$.

The laterals or branches $a$ and $b$ at one side of the perforation extend crosswise of the plate, and said plate adjacent said branches $a$ and $b$ of the perforation terminates in a right line which forms the chord of an arc in which the rest of the body of the plate is formed, so that one edge of the plate is formed in a bar 4 and the other edge in an arc from which the limbs $e$, $f$, $g$, and $h$ extend inwardly.

The form of the perforation between the limbs $e$, $f$, $g$, and $h$ may be circular, as shown, to receive a resilient body, desirably a helical spring 5, which may be inserted into the tire before the same is completed in order to positively return the tire to normal shape after the same has been released from any compression from its use.

The plates 1 may be fastened together by any suitable means, desirably by an adhesive and pegs, which may be in the form of nails, screws, or wooden pegs or headless tacks. Preferably wooden pegs will be used throughout the greater portion of the ring and will be driven directly through the plates.

6 designates wooden pegs driven through the leather plates 1 to fasten them together. Plates tapering in cross-section from outside to inside of the ring may be employed at greater or less intervals to give the circular form to the ring. 11 designates such tapering plates.

In practice to construct the tire the perforated plates of leather will be placed side by side in an appropriate former (not shown) and will be fastened together by the selected means—as, for instance, by an adhesive and by the wooden pegs 6 appropriately driven through the plates until the body of the jointed ring will have been completed; but the ends will not be fastened together. At the close of the operation of thus forming the ring the ends of the open ring may be spread apart to allow the pegs to be readily driven, after which the two ends of the open ring thus formed will be brought together and the final joint fastened by toe-nailing, as indicated at 7 in Fig. IV, and by an adhesive, and then wires $i$ may be applied in notches $j$ in the edges of the plates and extending around the tire near the crown and fastened tightly by any suitable means to cinch the plates tightly together. Desirably the plates are each transversely notched at the crown of the arch, as indicated at 8, and a leather or other band 9 is fastened by any suitable means in the annular channel which is formed by said notches 8. The band 9 may be of sole-leather or of any other suitable material and may be fastened in place by an adhesive and by pegs 10 or any suitable means driven through the band into the leather plates. 12 in Fig. IV designates the joint between ends of the band 9. It is to be understood that said band 9 may be made of one piece or of any convenient number of pieces fitted in the channel formed by the notches 8.

The tire may be fastened on the rim 13 of the wheel by any suitable means. An anchoring device may be applied inside the chamber formed by the perforations 3, and anchor rods or bolts 14 may be inserted through the wheel-rim 13 and screwed into said anchoring device. Said anchoring device may consist of one or more plates placed inside the chamber formed by the perforations 3. 15 designates such anchoring-plate in the form of a steel band.

In constructing the tire the perforated plates 1 may be strung one after another on the anchoring plate or band 15 and successively secured in place by the fasteners 6, and at the same time they may be also strung upon the helical spring or resilient body 5, the ends of which may be fastened together by brazing, soldering, or otherwise, while the open ends of the ring are drawn apart to allow that to be done, after which the ends of the leather tube may be brought or allowed to come together in response to the natural tendency of the ring-body and the action of the spring, which may have considerable tension calculated to draw and hold the ends of the open ring together.

To apply the tire to the rim of a wheel, the inner face 16 of the ring and the outer face 17 of the rim may be turned or otherwise formed to fit, and the ring may be forced into place upon the rim, after which the anchor-rods 14 may be passed through the rim and screwed into the anchor device 15 in the hollow chamber of the tire, or the tire may be applied while in the form of an open ring, the same being spread apart for that purpose, and then the ends brought together, after which the tire may be completed by fastening the ends of the open ring together by toe-nailing or otherwise.

In case it is desired to apply this invention to a wheel having a grooved rim, such as now in use for automobiles and the like, the groove may be filled by one or more blocks 18, the same being provided with the face 17, to which the tire is to be fitted. This form of construction is shown in Fig. III.

19 designates a cover, of leather or other suitable material, which may envelop the helical spring 5.

20 designates a tire-protector, which may be applied to the outside of the tire and secured in place by suitable rods or wires 21 and which may have a leather tread 22 at the crown.

The internal resilient body may be a pneumatic tube or any other form of body which will serve the purpose, and a desirable efficiency may be secured without any independent resilient body in the chamber.

By reason of the cross-sectional D shape of the tube the tire cannot wabble, twist, or turn in its seat on the rim of the wheel, and there is no danger of rim-chafing.

The cantaliver-limbs $e$ and $f$ are constructed to engage at the sides of their ends with supports, as plate 15 and limbs $g$ and $h$, under severe collapsing strains, and the strain is applied to flex the limb rather than to compress it, so that resiliency may be secured without the use of such expensive material as rubber. It is also to be observed that by the D form of cross-section the rounded form of tread is maintained; but a considerable saving of weight and of expensive material is effected as compared with tires circular in cross-section.

The broad band 9 in the broad channel 8 at the peripheral crown of the ring takes the wear and can be removed and replaced as required. The narrow bands $i$, embedded in the narrow channels $j$ at the sides of the crown, may be of great tensile strength without interfering with the resiliency of the tire.

The ends of the embedded wire bands may be fastened by brazing or in some other suitable manner.

Having described my invention, what I claim, and desire to secure by Letters Patent of the United States, is—

1. A tire comprising in combination, a series of perforated plates, D-shaped in cross-section, attached together and forming a hollow ring, a spring within said perforation, said plates provided with perforations forming a channel within said ring, and anchoring or retaining means within said channel adapted to hold said tire firmly upon the felly.

2. A tire comprising in combination, a series of perforated plates, D-shaped in cross-section, attached together and forming a hollow ring, a spring within said perforation, said plates provided with perforations forming a channel within said ring, anchoring or retaining means within said channel adapted to hold said tire firmly upon the felly, and a removable protecting-shoe provided on the tread.

3. A tire comprising in combination, a series of perforated plates, D-shaped in cross-section, attached together and forming a hollow ring, a spring within said perforation, said plates provided with perforations forming a channel within said ring, anchoring or retaining means within said channel adapted to hold said tire firmly upon the felly, said respective plates provided with notched portions adapted to form a channel at the tire-tread, and a protecting-shoe removably inserted thereon.

4. A tire comprising in combination, perforated and notched leather plates, D-shaped in cross-section, a resilient body adapted to support the walls of the chamber thereby formed, and a leather band fastened in the channel formed by said notched portions.

5. A tire comprising plates perforated to form a hollow ring and internal limbs, a resilient body in said hollow ring adapted to support the chamber formed thereby, and a removable part forming the tread.

6. A tire comprising plates perforated to form a hollow ring and internal limbs, a resilient body in said hollow ring adapted to support the chamber formed thereby, a removable part forming the tread, and bands at the sides of the crown or tread adapted to hold said plates closely together.

7. A tire comprising plates perforated to form a hollow ring and internal limbs, a resilient body in said hollow ring adapted to support the chamber formed thereby, a removable part forming the tread, said plates also perforated to form an anchor or retainer holding slot, and a retaining device provided therein adapted to firmly hold said tire upon the felly of a wheel.

8. A tire comprising plates perforated to form a hollow ring and internal limbs, a resilient body in said hollow ring adapted to support the chamber formed thereby, a removable part forming the tread, bands at the sides of the crown or tread adapted to hold said plates closely together, said plates also perforated to form an anchor or retainer holding slot, and a retaining device provided therein adapted to firmly hold said tire upon the felly of a wheel.

9. A tire comprising leather plates perforated to form a hollow ring and internal limbs, a helical spring mounted therein, adapted to support the chamber formed thereby, a cover enveloping said spring, means for holding said plates firmly in position, a removable tread, and means for attaching said tire to a wheel-felly.

10. A tire comprising perforated leather plates fastened together by pegs to form a hollow ring, and having internal limbs, and a spiral spring in the hollow chamber of the ring for supporting said limbs.

11. A tire comprising perforated and notched leather plates fastened together to form a hollow ring having a channel therearound, and a leather band fastened in said channel.

12. A tire comprising perforated and notched leather plates fastened together to form a hollow ring having a channel therearound, a band in said channel, and pegs fastening said band in said channel.

13. A tire comprising plates fastened together and perforated to form a hollow ring, cantaliver-limbs provided in said plates, and an anchoring or retaining device adapted to retain said tire upon the felly of a wheel and to support strain tending to flex said limbs.

14. A tire comprising plates fastened together and perforated to form a hollow ring, cantaliver-limbs provided in said plates, an anchoring or retaining device adapted to retain said tire upon the felly of a wheel and to support strain tending to flex the limbs, and a leather band removably secured on the tread.

15. A tire comprising plates fastened together and perforated to form a hollow ring, cantaliver-limbs provided in said plates, an anchoring or retaining device adapted to retain said tire upon the felly of a wheel and to support strain tending to flex said limbs, said plates notched to form a channel at the tread, and a band removably inserted therein.

16. A tire comprising plates fastened together and perforated to form a hollow ring, cantaliver-limbs provided in said plates, an anchoring or retaining device adapted to retain said tire upon the felly of a wheel and to support strain tending to flex said limbs, said plates notched to form a channel at the tread, and a band inserted therein.

17. A tubular tire substantially D shape in cross-section having lateral cantaliver-limbs constructed to engage at the sides of their ends with supports to sustain compression of the tire by lateral flexure of the limb.

18. A tubular tire having internal lateral limbs and supports therefor, said limbs being constructed to engage at the sides of their ends with said supports whereby collapsing strains may be sustained by flexure of the limbs.

19. A tire comprising plates perforated and fastened together to form a hollow ring, an anchoring device in the chamber of said ring, an anchor fastened to said anchoring device and extending through the inner walls of said ring, and a removable band forming the tread.

20. A tire comprising, in combination, a series of plates perforated to form a hollow resilient ring and a channel, means securing said plates together, a supporting medium within said resilient ring, an anchoring device in said channel adapted to hold the tire on the wheel-felly, said plates provided with notches forming a notched tread and with a retaining-notch, a removable tread-band, and a retaining device in said retaining-notch, substantially as described.

21. A tire comprising, in combination, plates perforated to form a hollow ring and cantaliver-limbs, a removable band forming the tread, and retaining or cinching means provided on opposite sides of said band, substantially as described.

22. A tire comprising, in combination, plates D-shaped in cross-section perforated to form a hollow ring and cantaliver-limbs, a removable band forming the tread, resilient means in said hollow ring, retaining or cinching means provided in said plates on opposite sides of said band, and means for holding the tire upon the wheel-felly.

23. A tire comprising, in combination, plates D-shaped in cross-section perforated to form a hollow ring and cantaliver-limbs, said plates provided with notches, an annular band removably inserted in said notches and forming the tread, retaining or cinching means mounted in notches in said plates on opposite sides of said band, a resilient member in said hollow ring, an anchoring device carried by said plates, and means for attaching the same to the wheel-felly.

24. A tire comprising, in combination, plates D-shaped in cross-section, attached together and forming a hollow ring, said plates notched at their crown, forming a channel therearound, a removable shoe inserted in said channel, and means for attaching said tire to a wheel-felly.

In testimony whereof I have signed my name to this specification, in the presence of two subscribing witnesses, at Los Angeles, in the county of Los Angeles and State of California, this 11th day of August, 1902.

LINCOLN CLIFFORD CUMMINGS.

Witnesses:
JAMES R. TOWNSEND,
JULIA TOWNSEND.